(12) United States Patent
Ozaki (10) Patent No.: US 7,613,737 B2
(45) Date of Patent: Nov. 3, 2009

(54) INFORMATION PROCESSING APPARATUS AND METHOD OF CONTROLLING SAME

(75) Inventor: Eriko Ozaki, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 655 days.

(21) Appl. No.: 11/441,983

(22) Filed: May 26, 2006

(65) Prior Publication Data

US 2006/0280447 A1 Dec. 14, 2006

(30) Foreign Application Priority Data

Jun. 8, 2005 (JP) ............................. 2005-168415

(51) Int. Cl.
*G06F 17/00* (2006.01)
(52) U.S. Cl. .................... 707/104.1; 707/101; 707/102; 707/103 R
(58) Field of Classification Search ............... 707/1–10, 707/100–104.1, 200–206
See application file for complete search history.

(56) References Cited

U.S. PATENT DOCUMENTS

2005/0050457 A1* 3/2005 Kurumatani ................ 715/513

2007/0101364 A1 5/2007 Morita

FOREIGN PATENT DOCUMENTS

| JP | 07-334523 | 12/1995 |
|---|---|---|
| JP | 10-283142 | 10/1998 |
| JP | 2001-337994 | 12/2001 |
| JP | 2004-289360 | 10/2004 |
| JP | 2004-356774 A | 12/2004 |

OTHER PUBLICATIONS

The above references were cited in a Aug. 8, 2008 Japanese Office Action issued in the counterpart Japanese Patent Application 2005-168415, a copy of which is enclosed.

* cited by examiner

*Primary Examiner*—Isaac M Woo
(74) *Attorney, Agent, or Firm*—Cowan, Liebowitz & Latman, P.C.

(57) ABSTRACT

A device connected via a network is queried with regard to its status, a thumbnail image of content data possessed by the device is displayed and an image indicative of the device is displayed in association with the thumbnail image. Based upon a response to the inquiry, it is determined whether or not the acquisition of the content data from the device is possible. The result of the determination is displayed in identifiable form.

13 Claims, 10 Drawing Sheets

FIG. 10

INFORMATION PROCESSING APPARATUS AND METHOD OF CONTROLLING SAME

FIELD OF THE INVENTION

This invention relates to an informatio processing apparatus for processing data that is input from a connected device, and to a method of controlling this apparatus.

BACKGROUND OF THE INVENTION

Personal computers display various types of data files in list form. Besides displaying the names of the files appended to the files, it is known in the art to display the files in the form of icons that conform to the characteristics of the files. A GUI (Graphical User Interface) in wide use as a method of expressing data in a form reduced in size expresses the nature of data visually in an easily understandable manner by subjecting the substance of the data to a size reduction and displaying the result. Further, images of reduced size referred to as "thumbnails" are used in cases where a plurality of image files obtained by picture-taking using a digital camera are displayed at one time. The same is true not only for files but also with regard to devices. For example, when devices inclusive of a hard disk and printer connected to a network are displayed in the form of a list, a widely used GUI expresses each of the devices by a bitmap icon in such a manner that the devices can be recognized with ease.

By thus using a reduced-size image or thumbnail indicating the nature of data, the general nature of the files and devices displayed in a list can be checked with facility. However, if there are multiple items of similar data, it is difficult to distinguish among these items of data based solely upon file names and thumbnails. Accordingly, in a technique proposed in the prior art, additional information regarding a generated thumbnail image is displayed superimposed on a predetermined position in a form overlapping the thumbnail image (see the specification of Japanese Patent Application Laid-Open No. 2001-337994).

Further, the specification of Japanese Patent Application Laid-Open No. 7-334523 discloses generating thumbnail images as search data and using these thumbnail images in a list display with respect also to data such as audio data that does not possess visual information.

Even though a file once used or a device once connected has been deleted, often the file or device is left displayed without being deleted from a list of "recently used files" or a list of devices provided by the operating system. Consequently, there are instances where the fact that a file or device has been deleted and is no longer usable is ascertained for the first time only when access to the file or device is actually attempted-based upon the list. Hence there is a problem in terms of ease of use. In order to deal with this, the specification of Japanese Patent Application Laid-Open No. 10-283142 describes a technique whereby information concerning a printer that has been connected to a network is accepted via the network and the operating status of the printer is displayed in real time based upon the information accepted.

With the conventional method described above, data and the status of a device, which is the storage location of the data, cannot be displayed simultaneously. Further, even though a technique for clearly indicating the status of a device has been disclosed, the status of the device storing the data and the data that has been stored cannot be displayed simultaneously.

SUMMARY OF THE INVENTION

Accordingly, an object of the present invention is to eliminate the shortcoming of the prior art set forth above.

Another object of the present invention is to provide an information processing apparatus and method for clearly indicating content data possessed by a device and status as to whether the data is usable or not.

According to the present invention, there is provided with an information processing apparatus for processing information input thereto from a device connected to the apparatus, comprising:

inquiry means for querying the device with regard to status of the device;

reduced-image display means for displaying a reduced image of content data possessed by the device;

device-image display means for displaying an image, which is indicative of the device, in association with the reduced image;

determination means for determining whether or not acquisition of the content data from the device is possible based upon a response to the inquiry made by the inquiry means; and display control means for identifiably displaying result of the determination by the determination means.

According to the present invention, there is provided with an information processing method in an information processing apparatus for processing information input thereto from a device connected to the apparatus, comprising:

an inquiry step of querying the device with regard to status of the device;

a reduced-image display step of displaying a reduced image of content data possessed by the device;

a device-image display step of displaying an image, which is indicative of the device, in association with the reduced image;

a determination step of determining whether or not acquisition of the content data from the device is possible based upon a response to the inquiry made in the inquiry step; and a display control step of identifiably displaying result of the determination in the determination step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail with reference to the accompanying drawings. It should be noted that the embodiments below do not limit the present invention set forth in the claims and that not all of the combinations of features described in the embodiments are necessarily essential as means for attaining the objects of the invention.

Figure 1:
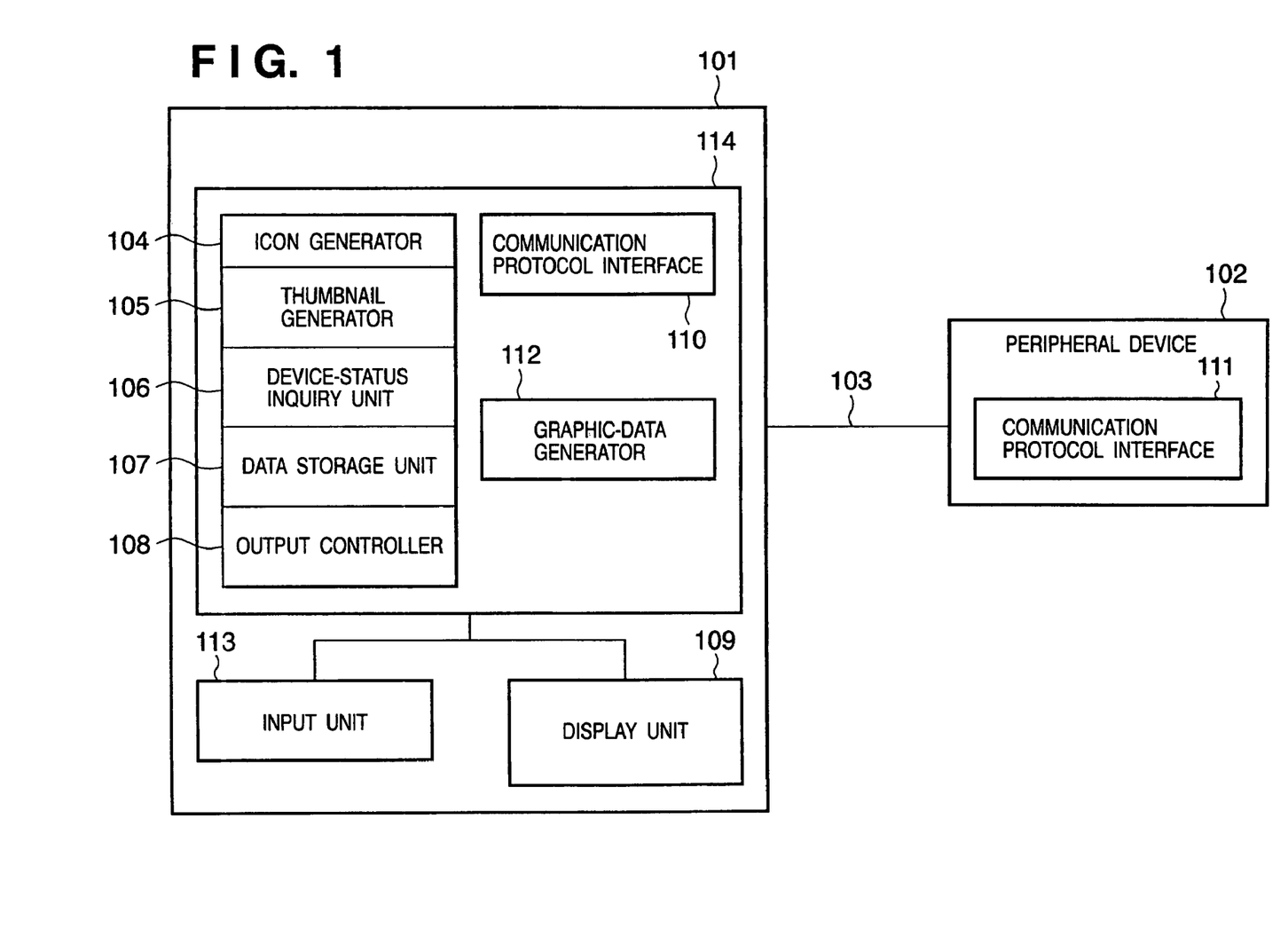
FIG. 1 is a block diagram illustrating the functional structure of an information processing apparatus according to an embodiment of the present invention.

FIG. 1 is a block diagram illustrating the functional structure of an information processing apparatus (e.g., a personal computer) according to an embodiment of the present invention.

As shown in FIG. 1, an information processing apparatus 101 is connected by communication protocol interfaces 110, 111 to a device 102 via a network 103. Data is sent and received between the information processing apparatus 101 and device 102. An icon generator 104 creates an icon that corresponds to the device 102 using data accepted from the device 102. A thumbnail generator 105 generates a thumbnail image from content data possessed by the device 102. The icon generator 104 may associate a previously registered icon with the corresponding device 102 or it may be so arranged that the user creates and registers any desired icon that corresponds to the device 102. A device-status inquiry unit 106 uses the communication protocol interface 110 to inquire about the status of the power supply of the device 102 and as to whether or not a desired storage medium has been inserted. A data storage unit 107 stores information concerning content data, which is possessed by the device 102, in association with the thumbnail image, which has been generated by the thumbnail generator 105, and the device 102. An output controller 108 exercises control in such a manner that thumbnail images are displayed in list form on a display unit 109. When the list is displayed, icons associated with respective ones of the thumbnail images are displayed, and if the status of an associated device is available, then a mark (graphic) clearly indicative of this status is also displayed.

The display unit 109 has a display device such as a CRT, liquid-crystal elements, a plasma display or SED, etc., and displays icons, various images and text, etc., based upon image data that is output from the output controller 108. When a list is displayed, a graphic-data generator 112 creates data representing a graphic (which corresponds to the above-mentioned mark) that is for clearly indicating that the data cannot be used, and sends this data to the output controller 108. This graphic data may be selected at will by the user from data already registered in the graphic-data generator 112, or the user may create the graphic data anew and register it. An input unit 113, which has a keyboard and a pointing device such as a mouse, is used to input various commands and data in accordance with operation by the user.

The information processing apparatus 101 has an information processor 114. This stores a processing program for implementing the icon generator 104, thumbnail generator 105, device-status inquiry unit 106, data storage unit 107, output controller 108 and communication protocol interface 110. These functions are implemented in accordance with the program, and the input unit 113 and display unit 109 are controlled accordingly. More specifically, the information processor 114 has at least a CPU (not shown), a program memory (not shown) for storing the processing program executed by the CPU, and a memory (not shown) that supplies a work area to temporarily store various data when processing is executed by the CPU. The functions of the components 104 to 108, 110 and 112 are implemented by cooperation between the processing program and CPU. The information processor further includes a hard disk (not shown) in which the processing program has been installed. When the processing program is executed, the program may be loaded from the hard disk to a RAM (not shown) and executed.

Although the details of the communication. protocol interfaces 110 and 111 are not specifically set forth, any form of connection will suffice so long as signals can be exchanged with the device connected to the network 103. Of course, the network 103 may be wireless or wired, and it will suffice if data can be exchanged between the information processing apparatus 101 and device 102.

In order to give an illustration through a simple example, a case where there is a single information processing apparatus 101 and a single device 102 will be described. However, either or both of these may be plural in number.

Figure 2:
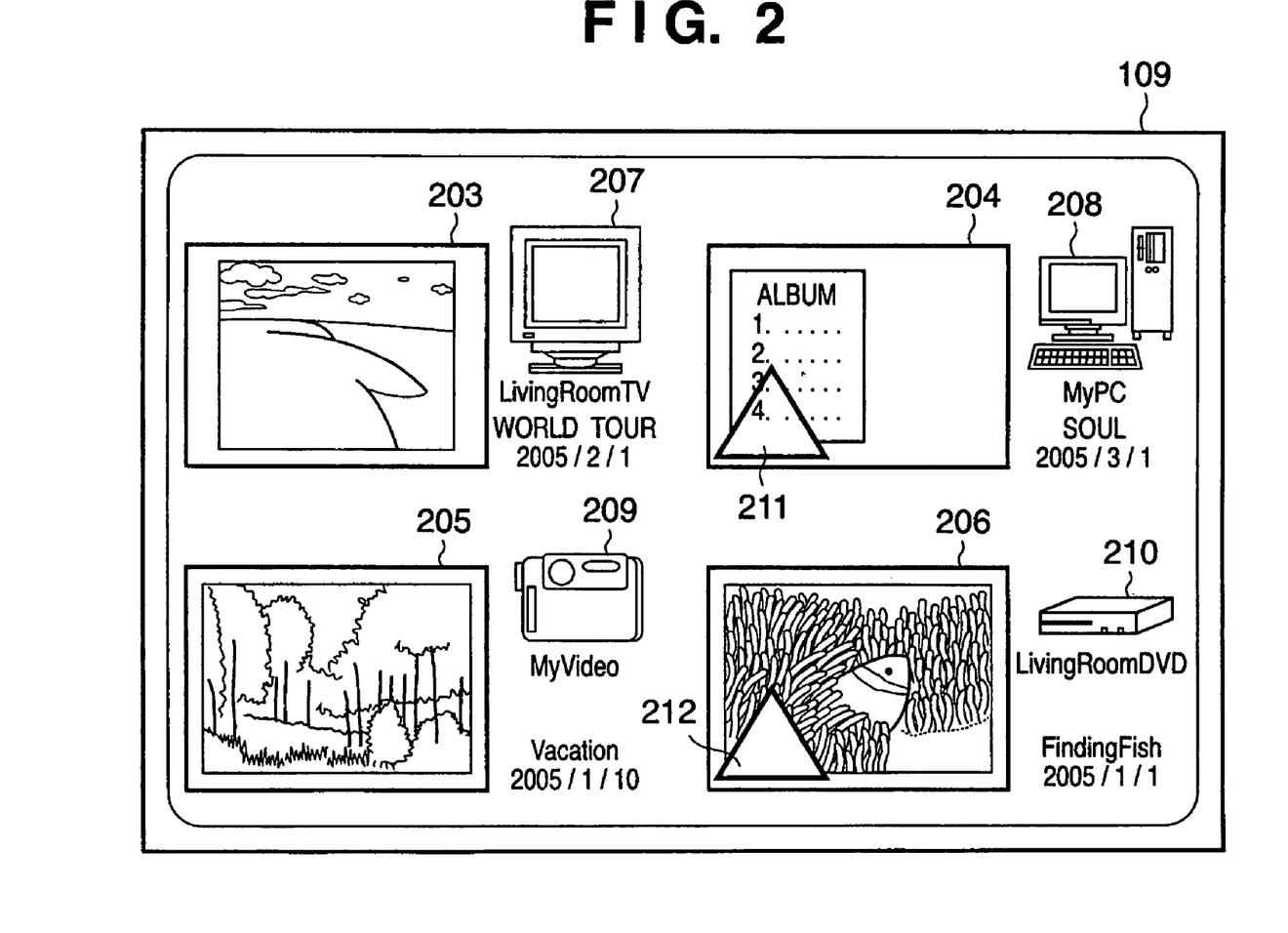
FIG. 2 is a diagram illustrating an example of an image displayed on a display unit by a GUI of the information processing apparatus according to this embodiment.

FIG. 2 is a diagram illustrating an example of an image displayed on the display unit 109 by the GUI of the information processing apparatus according to this embodiment.

Here data relating to four devices that have been connected to this information processing apparatus are being displayed as an example of a list display on a display screen. Reference numerals 203 to 206 denote thumbnail images of content data that has been stored in various devices or in media that have been inserted into these devices. Reference numerals 207 to 210 denote icons indicative of devices in which content data being displayed by respective ones of the corresponding thumbnail images has been stored. Further, reference numerals 211 and 212 denote examples of marks for clearly indicating to the user the fact that the devices storing the thumbnail images being displayed cannot be used. Here ordinary triangles are used as alert symbols. In the illustrated example, the marks 211 and 212 respectively indicate that a personal computer ("My PC") and a DVD player ("Living Room DVD"), which has been placed in a living room, cannot be used.

By way of example, the thumbnail image 205 indicates an image that has been recorded in a video camera. It will be understood that the title of this image is "Vacation" and that the video was recorded on Jan. 10, 2005. A thumbnail image, an icon representing the device in which this thumbnail image has been stored, the file creation date of the thumbnail image and the file name are displayed for each device. It should be noted that the present invention is not limited to this arrangement and that the images, icons and file names, etc., may be arrayed or combined in any fashion. Display regarding an icon need not always be presented, and it may be so arranged that an icon display is presented only when use of the file or device is not possible. Furthermore, it is assumed that the marks 211 and 212 displayed in a form superimposed on this list display can be set at will by the user.

A first embodiment of the present invention will now be described in detail.

First Embodiment

Figure 3:
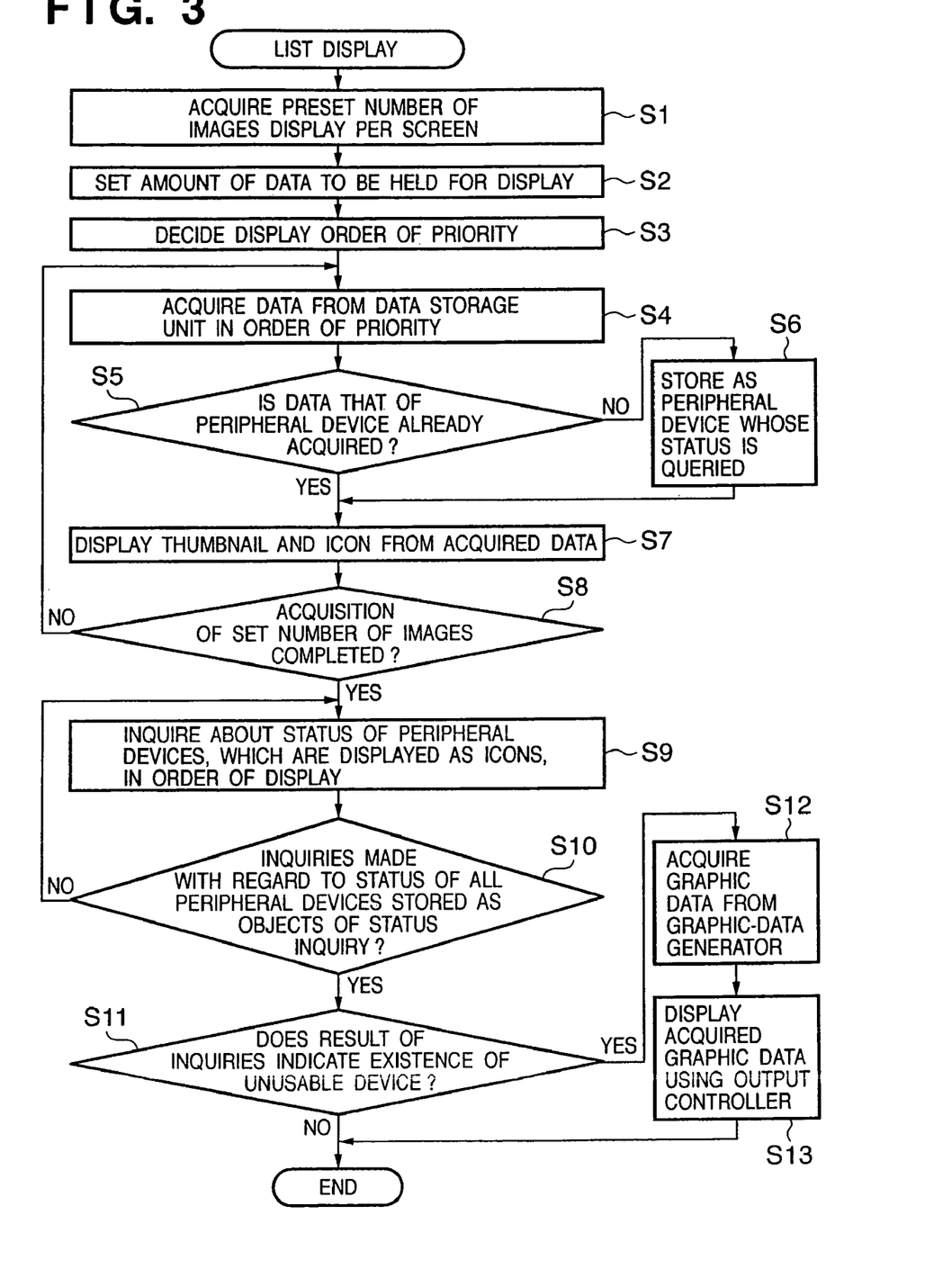
FIG. 3 is a flowchart for describing an example of operation when data is displayed in list form in the information processing apparatus according to an embodiment of the present invention.

FIG. 3 is a flowchart for describing an example of operation when data is displayed in list form in the information processing apparatus according to this embodiment of the present invention. The program for executing this processing is stored in a memory (not shown) of the information processor 114 and is executed under the control of the CPU (not shown). This list display is started when the result of a search based upon a data search is indicated. If a reproduced list of content data has been created, then the list display is started when the reproduced list id displayed.

First, at step S1 in FIG. 3, the number of images displayed on one screen of the display unit 109, this number having been stored in the memory of the information processor 114 beforehand, is acquired. If the number of images has not been set, a default number thereof is used. Next, at step S2, the amount of data to be held in order to display a number of thumbnails is set, based upon the number of display images obtained at step S1, and the memory area required is freed up. Here the amount of data to be held may be changed depending upon the speed of key scrolling resulting from key operation at the input unit 113. Alternatively, it may be so arranged that the image data representing this number of thumbnails is taken at one time. In any case, as long as the list display can be presented, there is no particular limitation regarding the method used.

Next, at step S3, the order of priority at which the thumbnail images are displayed is decided. The thumbnails may be displayed by order of date, by order of name (alphabetically) or by order of devices used most often (in order of decreasing number of times used). Alternatively, it may be so arranged that the user can set the order at will. In a case where no particular order has been set, a default order is used. Next, at step S4, information relating to the data possessed by the devices 102 is acquired from the data storage unit 107, in which the thumbnail images generated by the thumbnail generator 105 and the devices 102 have been associated and stored, in the order of priority acquired at step S3. Although it has been described that the information is acquired from data that has been stored in the data storage unit 107 of the information processing apparatus 101, this does not impose a limitation upon the present invention. It may be so arranged that if data can be acquired in real time from each device connected to the network 103, then the data is acquired directly from each of these devices. Next, at step S5, it is determined whether the data is data from a device already stored as a device of interest. If the decision rendered is "YES", then control proceeds to step S7; if "NO", control proceeds to step S6, the information of this device is stored and control proceeds to step S7. As a result, processing for acquiring data concerning the same device can be skipped from the next time onward.

At step S7, the content data of this device is acquired, a thumbnail image is created by the thumbnail generator 105 based upon the data acquired, an icon corresponding to this device is created by the icon generator 104, and the thumbnail and icon are displayed on the display unit 109 by the output controller 108. It may be so arranged that if the thumbnail and icon corresponding to this device have already been created and stored in the memory of the information processor 114, then the image data used previously may be stored in advance and used at step S7 without creating these images again. It is determined in step S8 whether display of the number of images set at step S1 has been completed. If display has not been completed, control returns to step S4 and the above-described processing is executed. If a "YES" decision is rendered at step S8, then control proceeds to step S9. It should be noted that when the "YES" decision is rendered, thumbnail images and icons corresponding to a plurality (four in this case) of devices are displayed, as illustrated in FIG. 2 according to this example. At this time the marks 211 and 212 indicative of device status are not being displayed.

At step S9, the device-status inquiry unit 106 inquires about the status of each device displayed as an icon. This is followed by step S10, at which it is determined whether all devices to be queried about their status have been queried. If the decision rendered is "NO", then control returns to step S9 and the above-described processing is repeated. If the decision rendered is "YES", on the other hand, then control proceeds to step S1, at which it is determined whether these devices include any devices for which it has been determined that the content data thereof cannot be used. If no such devices exist, then processing is exited directly. That is, in FIG. 2, for example, the state obtained would be one in which the marks 211 and 212 are not displayed (namely one in which all four devices would be usable).

On the other hand, if it is found at step S11 that devices determined to be unusable exist ("YES" at step S11) then control proceeds to step S12. Here graphic data (the marks 211 and 212 of FIG. 2) indicating that these devices are unusable are acquired by being generated by the graphic-data generator 112. Then, at step S13, the graphic data acquired is delivered to the output controller 108, the marks are displayed by the display unit 109 and processing is terminated.

It should be noted that a Universal Plug and Play (UPnP), for example, can be used as the protocol for communication between the information processing apparatus 101 and device 102. In accordance with UPnP, a plurality of devices can be connected directly to various networks and data can be exchanged between devices so connected. This means that the existence of other devices connected to the network and the functions of these devices can also be ascertained from a certain device. Further, with UPnP, there exist a "device" that provides a "service", which is a function of some kind, and a "control point" for finding and controlling the service. If the device is connected to a network, the control point of the network automatically senses the fact that the device has been connected. Of course, in a case where the control point has been connected to a network to which a device has been connected first, the control point automatically recognizes the existence of the device. Further, the control point is capable of ascertaining the service offered by a device and is also capable of executing this service.

Figure 4:
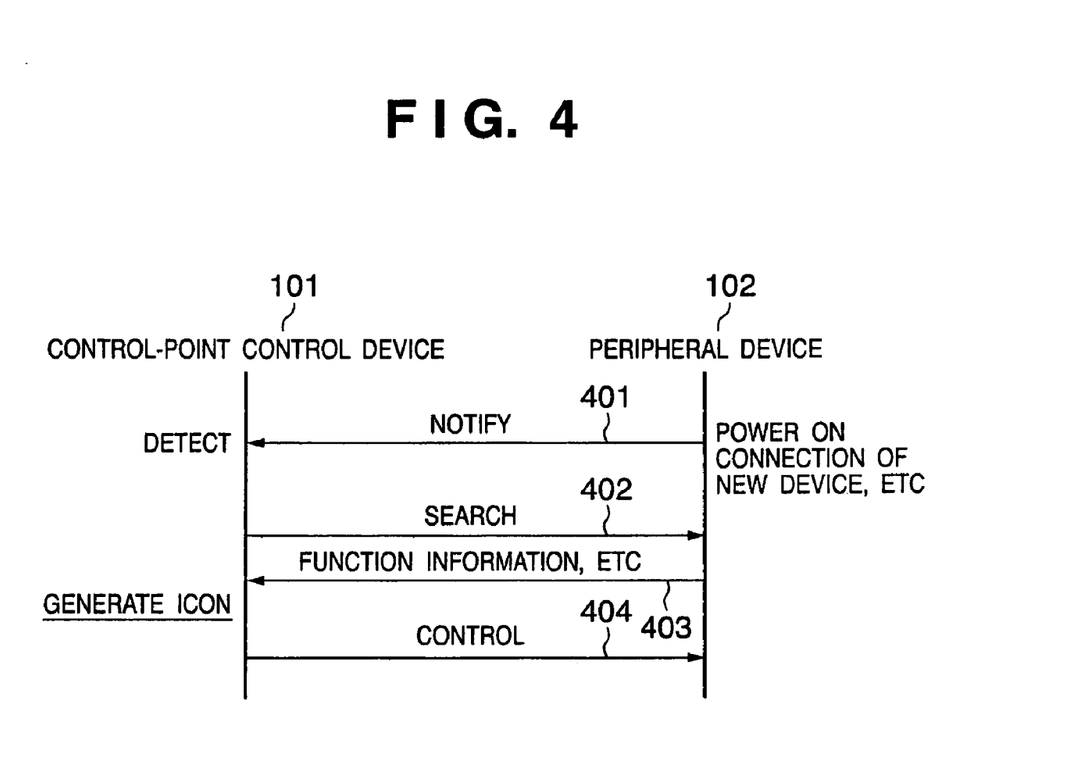
FIG. 4 is a diagram useful in describing a configuration in which the information processing apparatus of the embodiment is connected to a device by Universal Plug and Play (UPnP)

FIG. 4 is a diagram useful in describing a configuration in which the information processing apparatus 101 is connected to the device 102 UPnP.

If a device is connected anew, the control point of the information processing apparatus 101 is so notified by an advertise function (401). The control point of the information processing apparatus 101 thus notified by the advertise function detects the connected device by a search function (402). Based upon a device description (specification), which is information such as the model name or model number of the device 102, and device capability (capability information) of the device, a service description, which is information such as the type of operation controlled, is acquired (403). An icon image is generated by the icon generator 104 from the information thus acquired. Control of the device 102 from the information processing apparatus 101 becomes possible owing to such acquisition of information concerning the device 102. Since the icon corresponding to this device is displayed on the information processing apparatus 101 in this case, it may be so arranged that the user can operate the device 102 by using the input unit 113 to enter instructions with regard to the icon of the device.

If the fact that a new device has been connected is thus sensed by the communication protocol, then an icon image is created by the icon generator 104. By then displaying this icon image in association with the device, the status of the device can be made clear to the user.

Further, in this embodiment, a thumbnail image is created using the thumbnail generator 105. However, if a thumbnail has already been prepared for the device, then this thumbnail may be acquired and displayed. Further, the order of acquisition or display of data from the device may be reversed, and it is preferred that implementation be performed by a method that diminishes load on the information processing apparatus.

Thus, in accordance with the first embodiment, as described above, information relating to devices that have been connected to an information processing apparatus can be displayed in the form of a list. Further, data possessed by each device and the status of each device can be displayed together in this list display. As a result, it is possible to provide a GUI having a higher degree of user friendliness.

Second Embodiment

A second embodiment of the present invention will now be described in detail with reference to the drawings. The structure of the information processing apparatus 101 and the form of connection to the device 102 in the second embodiment are similar to those of the first embodiment and need not be described again.

Figure 5:
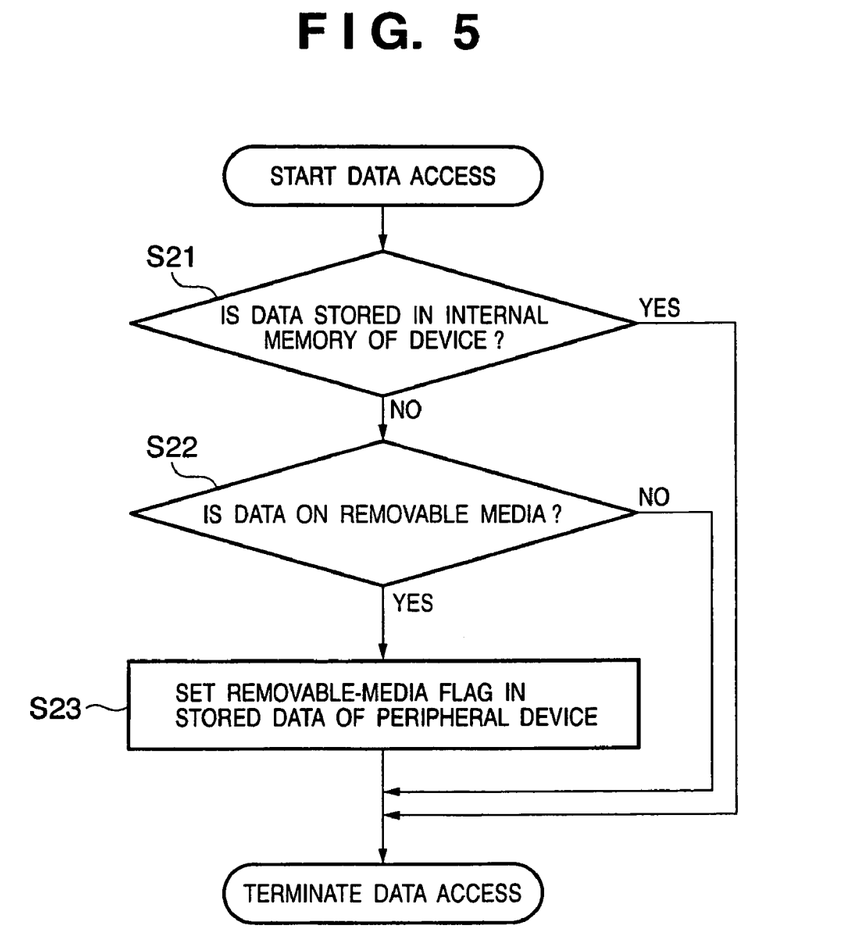
FIG. 5 is a flowchart for describing processing in an information processing apparatus according to a second embodiment of the present invention.

FIG. 5 is a flowchart for describing processing in the information processing apparatus 101 according to the second embodiment. The program for executing this processing is stored in a memory (not shown) of the information processor 114 and is executed under the control of the CPU (not shown). In a case where content data desired to be accessed has been stored on a removable disk of a device, this processing makes it clear to the user that the storage destination of this content data is the removable disk.

This processing is started in response to start of access to the data of device 102. The communication protocol interface 110 is used to access this data. At step S21 in FIG. 5, it is determined whether the content data of this device has been stored in an internal memory (RAM) of the device 102. If the content data has been stored in the internal memory, this data is acquired and processing is terminated.

On the other hand, if it is determined at step S21 that the data is stored not in the internal memory but on the disk, then control proceeds to step S22, where it is determined whether or not this storage medium is a removable disk. If the data has been stored on the removable disk, then control proceeds to step S23. Here the fact that the data is data that has been stored on the removable disk of the device 102 is stored in the stored data for presenting the list display in the information processing apparatus 101. In this case, an icon indicative of the fact that the data is data that has been stored on the removable disk may be displayed at the same time. The data is then acquired from the removable disk and access is terminated. On the other hand, if it is determined at step S22 that the data is not data from the removable disk, then the data is acquired and processing ended without execution of step S23.

As a result, the fact that the content data of a device has been stored on a removable disk can be displayed, in a form recognizable by the user, on the thumbnail image or icon that corresponds to the device in a list display of the kind shown in FIG. 2, by way of example.

Figure 6:
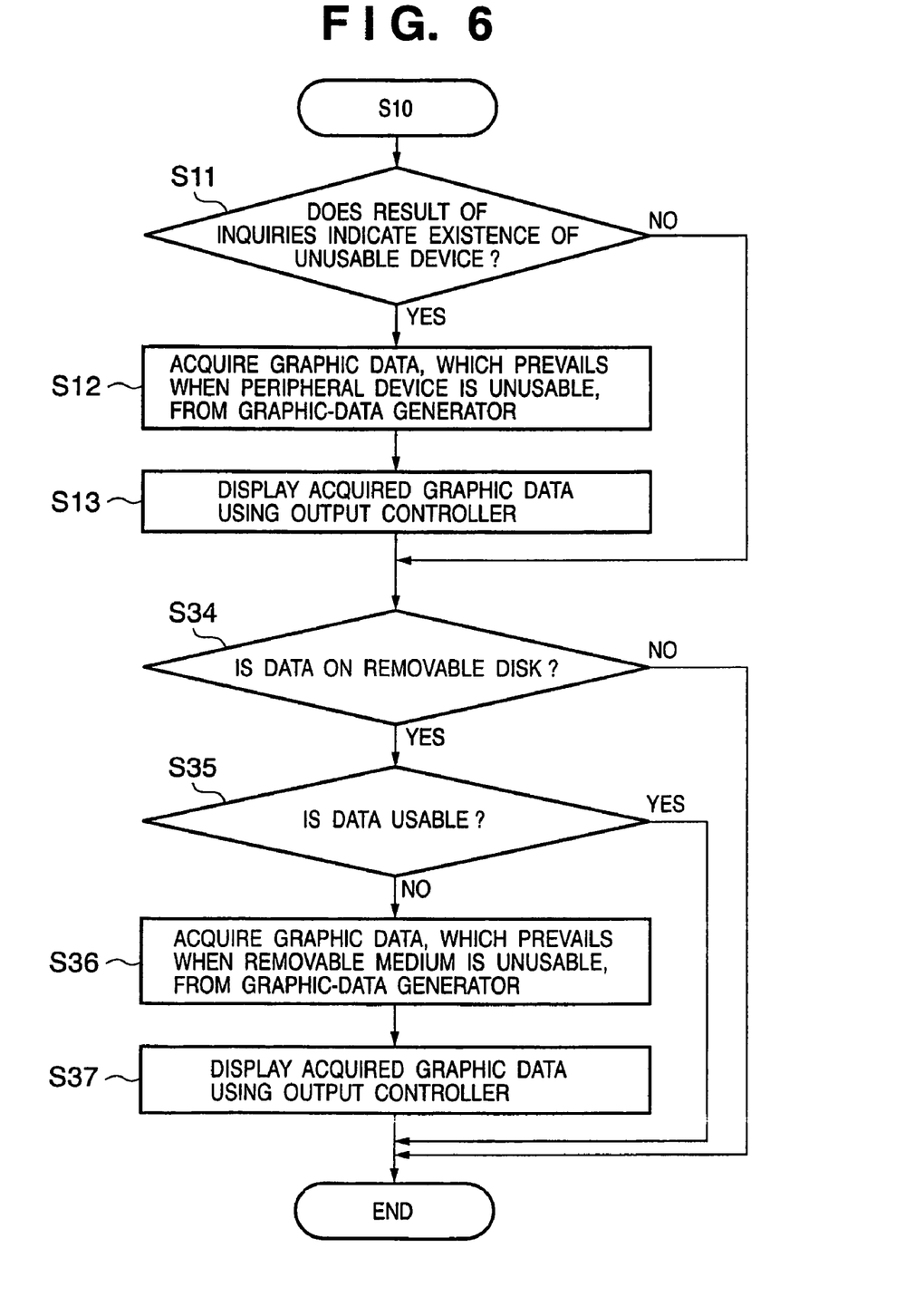
FIG. 6 is a flowchart for describing processing in an information processing apparatus according to the second embodiment.

FIG. 6 is a flowchart for describing processing in an information processing apparatus according to the second embodiment. The processing of steps S11 to S13 is identical with the processing that follows the "YES" decision at step S10 of the flowchart shown in FIG. 3 of the first embodiment and need not be described again.

At step S13, the graphic data for clearly indicating that a device is unusable is associated with the icon or thumbnail of this device and displayed together with the mark. After step S13, or if it is determined at step S11 that an unusable device does not exist upon the devices, control proceeds to step S34. Here whether data has been stored on a removable disk is checked based upon data that has been stored by the processing indicated in the flowchart of FIG. 4. If it is determined in step S34 that this content data has been stored on a removable disk, then control proceeds to step S35. Here the device is queried as to whether the content data is in a usable state. The reason for this is that in a case where the data was originally stored on a removable disk but has been copied to and stored in an internal memory of the device, whether the data can be used is judged by the device. This querying is implemented by the data search described in conjunction with the flowchart of FIG. 5.

If it is determined in step S35 that the content data cannot be used, control proceeds to step S36, where graphic data for clearly indicating the fact that the content data is unusable is acquired. Next, at step S37, the mark (211 in FIG. 2)is displayed on the display unit 109 by the output controller 108 based upon the data acquired. If it is determined at step S34 that the content data has not been recorded on a removable disk, or if data is found at step S35, then processing is terminated directly. It should be noted that items of graphic data representing marks indicating that devices or removable disks are not usable may be the same as one another or different from one another.

In accordance with the second embodiment, as described above, data corresponding to devices can be displayed in list form in such a manner that the fact that data is data that has been stored on removable disks of the devices can be ascertained when the list display is presented in an information processing apparatus.

As a result, by merely glancing at the list display, one can ascertain whether a disk on which data has been stored has been inserted into a device or whether the data on the disk has been copied to an internal memory of the device. The user can readily judge whether the data can be acquired from the device.

Third Embodiment

A third embodiment of the present invention will now be described in detail with reference to the drawings. The structure of the information processing apparatus 101 and the form of connection to the device 102 in the second embodiment are similar to those of the first embodiment and need not be described again.

Besides having the effects of the first and second embodiments, the third embodiment of the invention, in order to clearly indicate whether data in a list display is unusable, displays the reason in the form of text together with data. It should be noted that the inquiry regarding the status of the device is performed by the device-status inquiry unit 106 described above.

The device-status inquiry unit 106 is capable of inquiring about, e.g., the status of the power supply of a device using UPnP as the communication protocol, by way of example. If the device is returned to a state in which its power supply is off, "THE POWER IS OFF" may be displayed. Further, a display may be presented using the communication data as is. The content of the display and the method of presenting the display are not limited to those of this embodiment.

Figure 7:
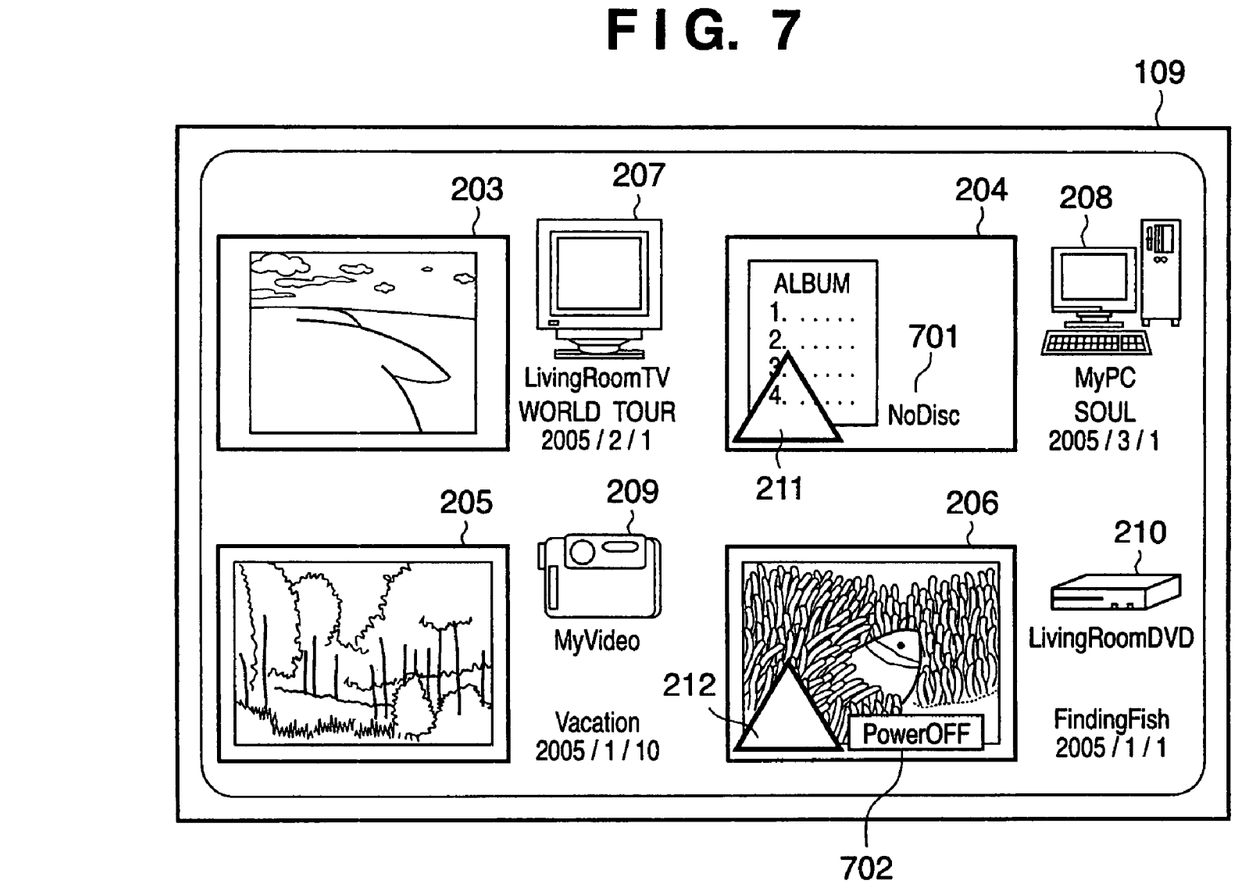
FIG. 7 is a diagram illustrating an example of a list display in an information processing apparatus according to a third embodiment of the present invention.

FIG. 7 is a diagram illustrating an example of a list display in the information processing apparatus 101 according to the third embodiment. Portions similar to those shown in FIG. 2 are designated by like reference characters and need not be described again.

In FIG. 7, data corresponding to a thumbnail image 204 is such that as a result of querying the device "My PC", the fact that the content data of this device cannot be used is clearly indicated by the mark 211 because the data has not been stored in the device "My PC". The fact that this content data has been stored on the removable disk is stored in the data storage unit 107. Accordingly, if the data is not found by the device, then this removable disk has not been inserted into the device and, hence, it can be determined that the content data is not utilizable. As indicated at 701, therefore, the reason why the content data cannot be used is displayed as text reading "No Disc" (meaning that the disk has not been inserted).

The data corresponding to the thumbnail image 206 indicates a case where as a result of the inquiry by the device-status inquiry unit 106, it has been determined that the device is not in a usable state. In this case, the fact that the device is unusable is clearly indicated by the mark 212. Furthermore, if the power supply of the device is found to be off by the device-status inquiry unit 106, then the reason why the device cannot be used is clearly indicated as text reading "Power OFF" (meaning that the power supply is OFF), as shown at 702.

In accordance with the third embodiment, as described above, when a list display of data is presented, unusable content data (and devices) are clearly indicated and the reasons why these cannot be used can be clearly indicated at the same time. As a result, the user can ascertain the reason why the data cannot be used and can take the corresponding countermeasures. This enhances user convenience.

Fourth Embodiment

A fourth embodiment of the present invention will now be described in detail with reference to the drawings. The structure of the information processing apparatus 101 and the form of connection to the device 102 in the fourth embodiment are similar to those of the first embodiment and need not be described again.

In the fourth embodiment, unusable content data (devices) is clearly indicated, as in the first embodiment, and remedies are presented in the form of text at the same time.

Figure 8:
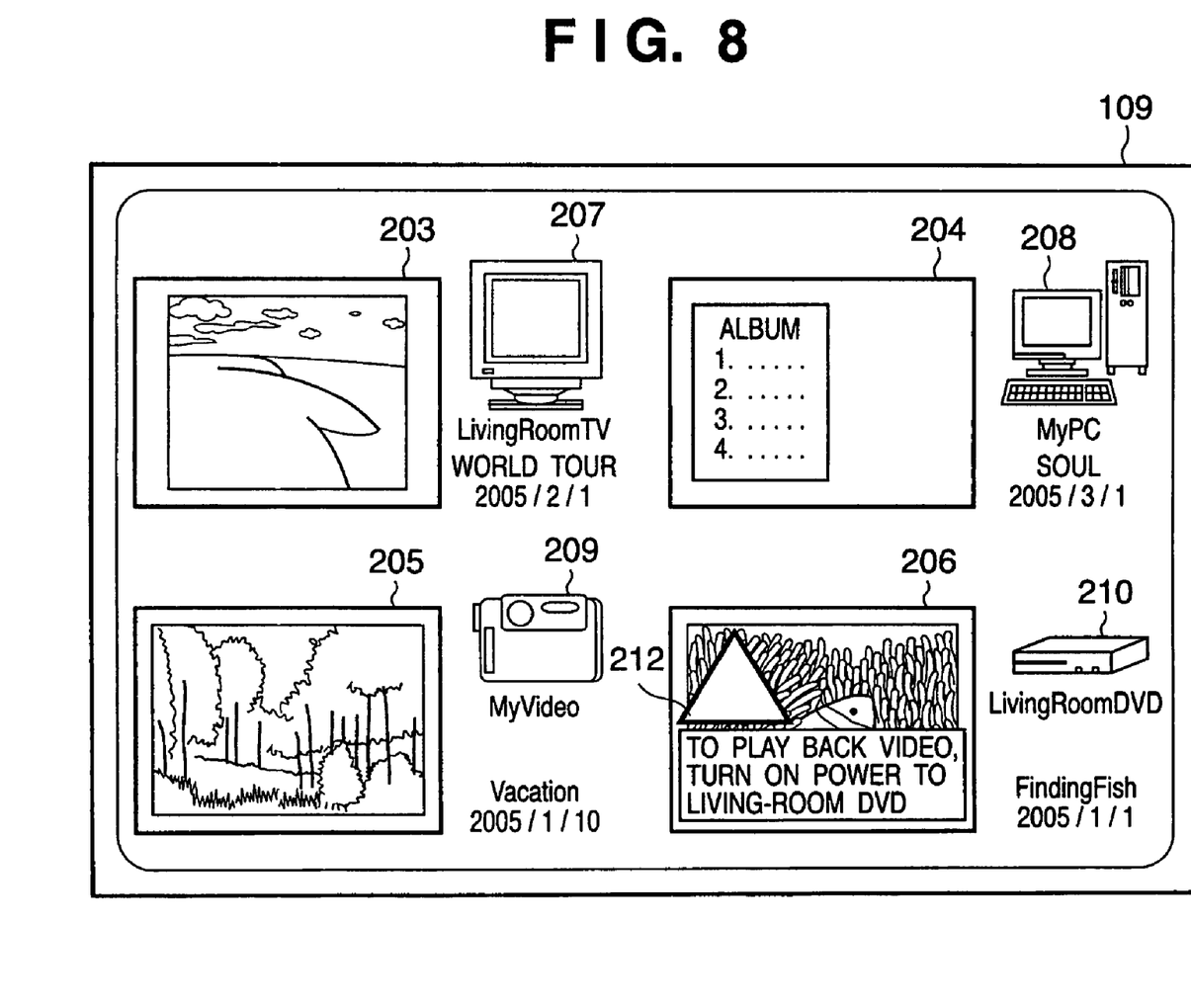
FIG. 8 is a diagram illustrating an example of a list display in an information processing apparatus according to a fourth embodiment of the present invention.

FIG. 8 is a diagram showing an example of a list display in the information processing apparatus 101 according to the fourth embodiment. Portions similar to those shown in FIG. 2 are designated by like reference characters and need not be described again.

In FIG. 8, thumbnail image 206 indicates video that has been recorded on a DVD placed in a living room. The mark 212 clearly indicates that it is not possible to reproduce images corresponding to this thumbnail. In this example, the result of the inquiry performed by the device-status inquiry unit 106 is that the power supply of the DVD is off and therefore it has been determined that the DVD is unusable. Accordingly, in the fourth embodiment, a message reading "TO PLAY BACK VIDEO, TURN ON POWER TO LIVING-ROOM DVD" is displayed in addition to the mark 212.

Figure 9:
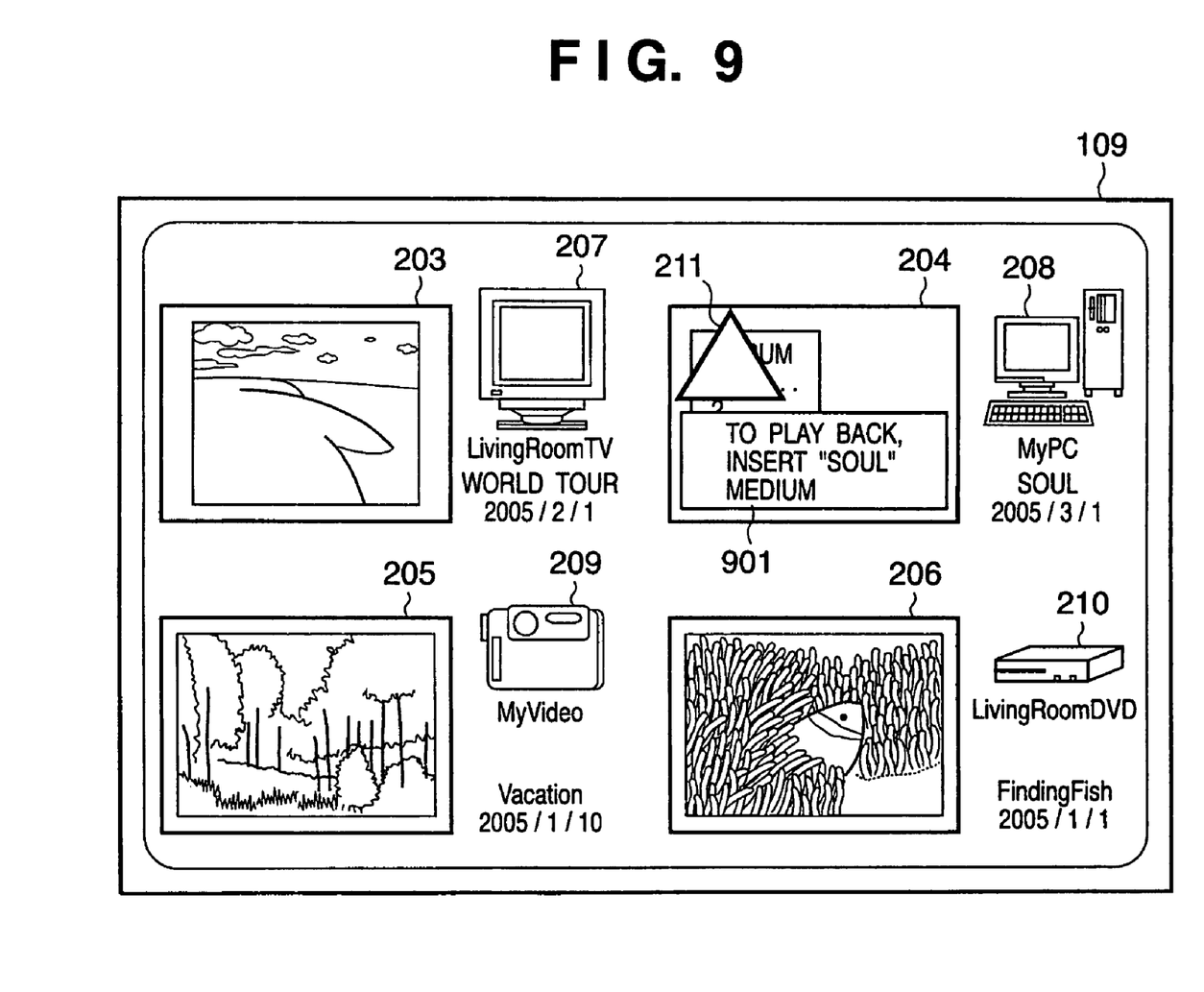
FIG. 9 is a diagram illustrating an example of a list display according to a modification of the fourth embodiment.

FIG. 9 is a diagram illustrating a modification of the fourth embodiment. In the case illustrated in FIG. 9, a disk has not been inserted into the device "My PC" and therefore the content data cannot be used. In this case, a message 901 reading "TO PLAY BACK, INSERT 'SOUL' MEDIUM" is displayed as the remedy.

Figure 10:
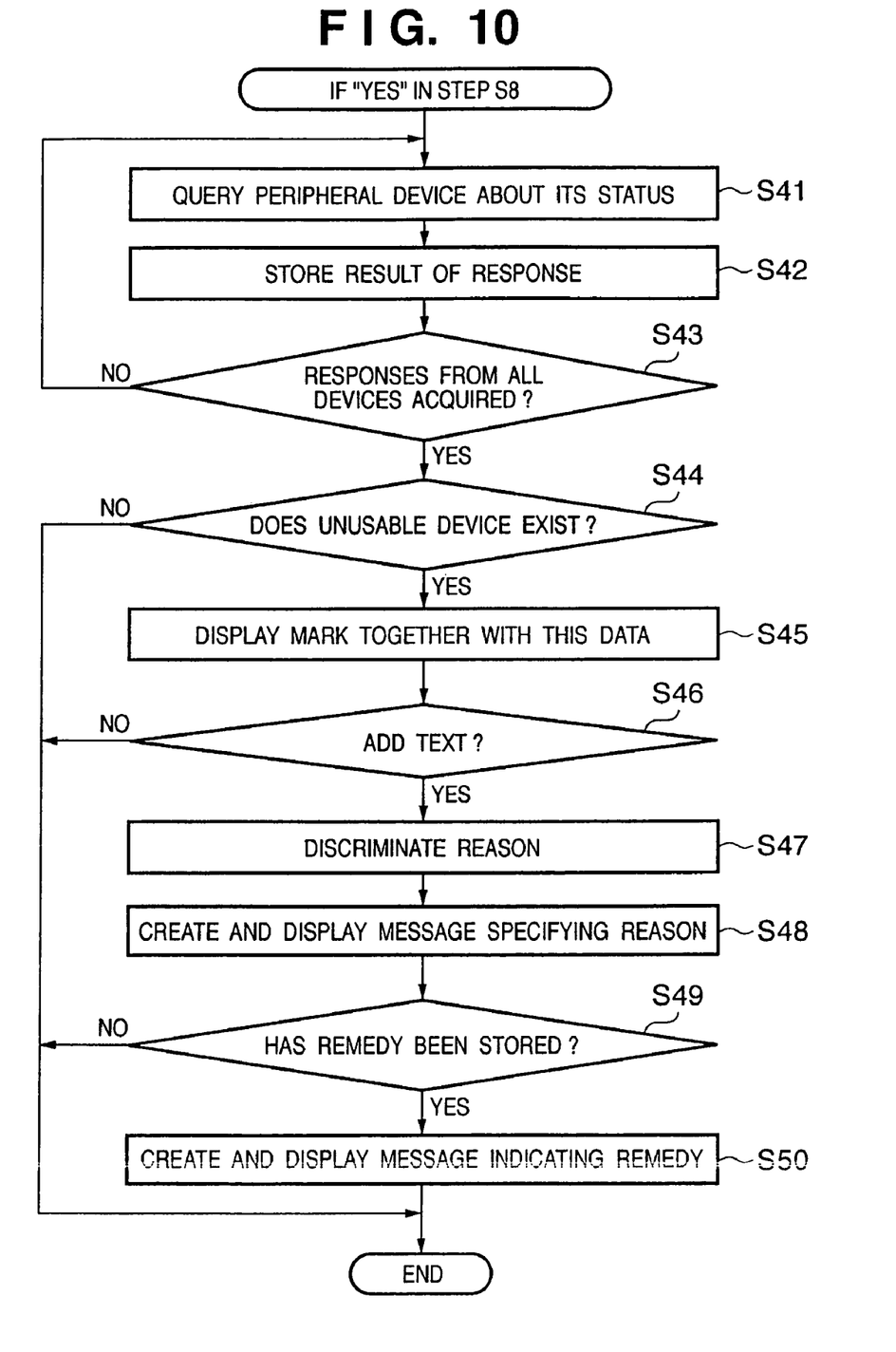
FIG. 10 is a flowchart for describing processing in an information processing apparatus according to the fourth embodiment.

FIG. 10 is a flowchart for describing processing in the information processing apparatus 101 according to the fourth embodiment. The program for executing this processing has been stored in the memory of the information processor 114. It should be noted that this processing is illustrated as processing that follows the "YES" decision at step S8 in FIG. 3.

First, at step S41 in FIG. 10, the device-status inquiry unit 106 queries the devices about their status. Next, at step S42, the response from each of the devices is stored in memory. This is followed by step S43, at which it is determined whether responses to inquiries to all devices of interest have been received. Steps S41 to S43 are executed repeatedly until responses are received from all of the devices.

If responses from all devices of interest have been received, control proceeds to step S44, where it is determined whether there is a device whose content data cannot be used. If such a device does not exist, processing is terminated directly. If such a device exists, however, control proceeds to step S45 and the mark 211, etc., is displayed together with the thumbnail image that corresponds to this device. Next, at step S46, it is determined whether display of the mark is to be accompanied by display of a message (text). If a message is not to be displayed, processing is terminated directly. When a message is to be displayed, however, control proceeds to step S47, where the reason why the content data from this device cannot be used is discriminated. This is achieved by encoding and storing, at step S42, the device status, such as no power, no medium or other data currently being reproduced, in accordance with the response from the device. At step S48, a character pattern indicative of a message that specifies the reason is generated, delivered to the output controller 108 and displayed on the display unit 109 (see 702 in FIG. 7). This can be put into table form by correlating codes corresponding to the status of the device and messages (character codes) that indicate the meaning thereof in detail. The message can be created by referring to the table.

Next, at step S49, it is determined whether a method of remedying the problem has already been stored. If the method has been stored, control proceeds to step S50. Here a message indicating the corresponding remedy is created, delivered to the output controller 108 and displayed on the display unit 109 (see 206 and 901 in FIGS. 8 and 9).

The operation at step S50 can readily be achieved by putting the reasons (codes) for problems and the remedies (text) for these problems into tabular form and storing the table in advance, and expanding a remedy corresponding to a reason into a character pattern.

In FIGS. 8 and 9, the background of the text display area is indicated in white for the sake of description. However, characters alone may be displayed. In either case, it will suffice to present a display so as to enhance the visibility of the text.

Further, in FIGS. 7 to 9, the reason why a device cannot be used and the remedy are not displayed at the same time. However, both the reason and the remedy may be displayed simultaneously.

Furthermore, by registering the locations where devices are installed, it is possible to indicate where a device whose power supply is to be turned on is located, by way of example. This will make it possible to display "TO PLAY BACK VIDEO, TURN ON POWER TO DVD IN $1^{ST}$-FLOOR LIVING ROOM" instead of "TO PLAY BACK VIDEO, TURN ON POWER TO LIVING-ROOM DVD" in the example of FIG. 8. Furthermore, by arranging it so that the user can set and register the names of icons at will, the location at which a device has been placed can be included in the name of the icon. For example, by changing "Living-Room DVD" to "$1^{st}$-Floor Living-Room DVD", the user can readily identify the fact that the DVD is in the $1^{st}$-floor living room.

Thus, in accordance with the fourth embodiment, when a device cannot be used, a mark clarifying the fact that the device is not usable is displayed in a list display and the mark is accompanied by a remedy in order to make it possible to use the device.

It should be noted that the object of the invention is attained also by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the embodiments and the storage medium storing the program codes constitutes the invention.

Examples of storage media that can be used for supplying the program code are a floppy (registered trademark) disk, hard disk, magneto-optical disk, CD-ROM, CD-R, DVD-ROM, DVD-RAM, DVD–R, DVD+R, DVD–RW, DVD+RW, HD-DVD, Blueray Disc, magnetic tape, non-volatile type memory card or ROM, etc. Further, the program codes can be downloaded via a network.

Furthermore, besides the case where the aforesaid functions according to the embodiment are implemented by executing the program codes read by a computer, it goes without saying that the invention covers a case where an operating system or the like running on the computer performs a part of or the entire process in accordance with the designation of program codes and implements the functions according to the embodiments.

Furthermore, the present invention also covers a case where, after the program codes read from the storage medium are written in a memory provided on a function expansion board inserted into the computer or in a memory provided in a function expansion unit connected to the computer, a CPU or the like contained in the function expansion board or function expansion unit performs a part of or the entire process in accordance with the designation of program codes and implements the functions of the above embodiments.

In accordance with the embodiments, as described above, it is possible to clearly indicate that data that appears in a list display is in an unusable state owing to the status of the device that is the storage location of the data.

Further, in a case where the content data has been stored on a removable medium, it is possible to clearly indicate that the medium is unusable owing to the status of the medium.

Further, a case where content data cannot be used owing to the status of the device where the content data is stored, or a case where content data has been recorded on a removable medium but the medium has not been inserted to the device, can be reflected in the list display. As a result, the user can readily confirm in which the device and on which medium the desired content data exists.

Furthermore, with regard to data that appears in a list display, the reason (cause) why some content data cannot be used and/or a method of remedying the problem can be presented to the user. This greatly enhances convenience of use.

The present invention is not limited to the above embodiments and various changes and modifications can be made within the spirit and scope of the invention. Therefore, to apprise the public of the scope of the present invention, the following claims are made.

This application claims the benefit of Japanese Application No. 2005-168415, filed Jun. 8, 2005, which is hereby incorporated by reference herein in its entirety.

What is claimed is:

1. An information processing apparatus for processing information input thereto from a device connected to the apparatus, comprising:
   an inquiry unit that inquires the device with regard to status of the device;
   a reduced-image display unit that displays a reduced image of content data possessed by the device;
   a device-image display unit that displays an image, which is indicative of the device, in association with the reduced image;
   a determination unit that determines whether or not acquisition of the content data from the device is possible based upon a response to the inquiry made by the inquiry unit;
   a display control unit that identifiably displays result of the determination by the determination unit;
   an identification unit that identifies a reason for the determination made by the determination unit; and
   a message display unit that creates a text message, which indicates the reason for the determination, based upon the reason for the determination identified by the identification unit, and displays the text message in association with the image indicative of the device or the reduced image.

2. The apparatus according to claim 1, wherein the inquiry unit further queries the device with regard to storage destination of the content data; and
   the determination means unit determines whether or not acquisition of the content data from the device is possible based upon the storage destination and the status of the device.

3. The apparatus according to claim 1, wherein the display control unit displays a mark, which indicates that acquisition of the content data from the device is possible or not, in association with the image indicative of the device or the reduced image.

4. The apparatus according to claim 1, further comprising:
   an identification unit that identifies a reason for the determination made by the determination unit; and
   a remedy-message display unit that creates a text message, which indicates a method of remedying the reason for the determination, based upon the reason for the determination identified by the identification unit, and displays the text message in association with the image indicative of the device or the reduced image.

5. The apparatus according to claim 1, further comprising a storage unit that stores information relating to a location at which the device has been installed;

wherein the device-image display unit displays the information relating to the location by appending this information to the image indicative of the device.

6. The apparatus according to claim 5, further comprising:
an identification unit that identifies a reason for the determination made by the determination unit; and
a remedy-message display unit that creates a text message, which relates to a method of remedying the reason for the determination and to the location of installation, based upon the reason for the determination identified by the identification unit, and displays the text message in association with the image indicative of the device or the reduced image.

7. An information processing method in an information processing apparatus for processing information input thereto from a device connected to the apparatus, comprising:
an inquiry step of querying the device with regard to status of the device;
a reduced-image display step of displaying a reduced image of content data possessed by the device;
a device-image display step of displaying an image, which is indicative of the device, in association with the reduced image;
a determination step of determining whether or not acquisition of the content data from the device is possible based upon a response to the inquiry made in the inquiry step;
a display control step of identifiably displaying result of the determination in the determination steps,
an identification step of identifying a reason for the determination made in the determination step; and
a message display step of creating a text message, which indicates the reason for the determination, based upon the reason for the determination identified in the identification step, and displaying the text message in association with the image indicative of the device or the reduced image.

8. The method according to claim 7, wherein the inquiry step further includes querying the device with regard to storage destination of the content data; and
it is determined in the determination step whether or not acquisition of the content data from the device is possible based upon the storage destination and the status of the device.

9. The method according to claim 7, wherein the display control step displays a mark, which indicates that acquisition of the content data from the device is not possible, in association with the image indicative of the device or the reduced image.

10. The method according to claim 7, further comprising:
an identification step of identifying a reason for the determination made in the determination step; and
a remedy-message display step of creating a text message, which indicates a method of remedying the reason for the determination, based upon the reason for the determination identified in the identification step, and displaying the text message in association with the image indicative of the device or the reduced image.

11. The method according to claim 7, further comprising a step of storing information relating to a location at which the device has been installed;
wherein the device-image display step displays the information relating to the location by appending this information to the image indicative of the device.

12. The method according to claim 11, further comprising:
an identification step of identifying a reason for the determination made in the determination step; and
a remedy-message display step of creating a text message, which relates to a method of remedying the reason for the determination and to the location of installation, based upon the reason for the determination identified in the identification step, and displaying the text message in association with the image indicative of the device or the reduced image.

13. A computer-readable storage medium for storing a computer program for causing a computer to execute the information processing method set forth in claim 7.

* * * * *